(12) United States Patent
Poedjono (10) Patent No.: US 9,038,746 B2
(45) Date of Patent: May 26, 2015

(54) METHOD FOR DETERMINING WELLBORE POSITION USING SEISMIC SOURCES AND SEISMIC RECEIVERS

(75) Inventor: Benny Poedjono, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1055 days.

(21) Appl. No.: 12/936,317

(22) PCT Filed: Mar. 24, 2009

(86) PCT No.: PCT/US2009/038078
§ 371 (c)(1),
(2), (4) Date: Dec. 22, 2010

(87) PCT Pub. No.: WO2009/126430
PCT Pub. Date: Oct. 15, 2009

(65) Prior Publication Data
US 2011/0100712 A1    May 5, 2011

Related U.S. Application Data

(60) Provisional application No. 61/042,966, filed on Apr. 7, 2008.

(51) Int. Cl.
*E21B 7/04*      (2006.01)
*E21B 47/022*    (2012.01)
*G01V 1/42*      (2006.01)

(52) U.S. Cl.
CPC ............ *E21B 47/02208* (2013.01); *G01V 1/42* (2013.01)

(58) Field of Classification Search
CPC .............. E21B 7/06; E21B 7/04; E21B 47/02
See application file for complete search history.

(56) References Cited

U.S. PATENT DOCUMENTS 3,979,724 A * 9/1976 Silverman et al. .............. 367/36
4,407,374 A   10/1983 Wallussek et al.
(Continued)

FOREIGN PATENT DOCUMENTS

JP    60100711 A    6/1985
JP    63-32085 A    2/1988
(Continued)

OTHER PUBLICATIONS

D. Reichhardt, "Development of an Innovative Downhole Seismic Source," Am. Geophysical Union, Spg Meeting, 2005, Abstr # NS51A-05, http://adsabs.harvar.edu/abs/2005AGUSMNS51A..05R.

(Continued)

*Primary Examiner* — Jennifer H Gay
*Assistant Examiner* — Caroline Butcher
(74) *Attorney, Agent, or Firm* — Kimberly Ballew; Chadwick A. Sullivan (57) ABSTRACT

A method for determining position of a wellbore in the Earth's subsurface includes actuating a plurality of seismic energy sources each disposed at a known geodetic position. Seismic energy from the sources is detected at a selected location along the wellbore. The geodetic position at the selected location is determined from the detected seismic energy. A corresponding method includes actuating a seismic energy source at a selected position within the wellbore. The seismic energy is detected at a plurality of known geodetic positions. The geodetic position of the source is determined from the detected seismic energy.

20 Claims, 5 Drawing Sheets

(56) References Cited

U.S. PATENT DOCUMENTS

| | | | |
|---|---|---|---|
| 4,715,469 A | 12/1987 | Yasuda et al. | |
| 4,874,061 A | 10/1989 | Cole | |
| 4,920,655 A | 5/1990 | van Steenwyk | |
| 5,382,760 A | 1/1995 | Staron | |
| 5,419,405 A * | 5/1995 | Patton | 175/27 |
| 5,555,220 A | 9/1996 | Minto | |
| 5,803,185 A | 9/1998 | Barr et al. | |
| 6,089,332 A | 7/2000 | Barr et al. | |
| 6,193,010 B1 * | 2/2001 | Minto | 181/102 |
| 7,405,563 B2 | 7/2008 | Kruspe et al. | |
| 8,813,869 B2 * | 8/2014 | Bennett et al. | 175/24 |
| 2004/0240320 A1 | 12/2004 | McDonald et al. | |
| 2005/0279532 A1 * | 12/2005 | Ballantyne et al. | 175/40 |
| 2006/0225926 A1 | 10/2006 | Madhavan et al. | |
| 2007/0039776 A1 * | 2/2007 | Clark | 181/110 |
| 2008/0110691 A1 | 5/2008 | Chang et al. | |

FOREIGN PATENT DOCUMENTS

| | | | |
|---|---|---|---|
| JP | 63-032085 A | 2/1988 | |
| JP | 8-309282 A | 11/1996 | |
| JP | 08-333982 A | 12/1996 | |
| JP | 10-318748 A | 12/1998 | |
| JP | 2000088969 A | 3/2000 | |
| JP | 2003085594 A | 3/2003 | |
| JP | 2003529694 A | 10/2003 | |
| JP | 2007224569 A | 9/2007 | |
| JP | 2008076352 A | 4/2008 | |
| WO | 2004086093 A1 | 10/2004 | |
| WO | 2009126430 A3 | 10/2009 | |

OTHER PUBLICATIONS

Japanese Official Action for Japanese Application No. 2011-504047 dated May 1, 2013.

Combined Search and Examination Report issued in GCC/P/2009/13213 on Aug. 27, 2012, 7 pages.

Japanese Office Action issued in JP2011-504047 on May 1, 2013, 3 pages.

International Search Report and Written Opinion issued in PCT/US2009/038078 on Nov. 24, 2009, 7 pages.

Japanese Office Action issued in JP2011-504047 on May 12, 2014, 3 pages.

* cited by examiner

METHOD FOR DETERMINING WELLBORE POSITION USING SEISMIC SOURCES AND SEISMIC RECEIVERS

CROSS-REFERENCE TO RELATED APPLICATIONS

Priority is claimed from U.S. Provisional Application No. 61/042,966 filed on Apr. 7, 2008.

STATEMENT REGARDING FEDERALLY SPONSORED RESEARCH OR DEVELOPMENT

Not applicable.

BACKGROUND OF THE INVENTION

1. Field of the Invention

The invention relates generally to the field of directional drilling of wellbores through subsurface rock formations. More particularly, the invention relates to techniques for determining the geodetic trajectory and position of a directionally drilled wellbore using seismic techniques.

2. Background Art

Wellbores drilled through subsurface rock formations are used for, among other purposes, extracting oil and gas from subsurface reservoirs. Many wellbores are drilled to have a selected trajectory, that is to say, along a selected geodetic path through the subsurface other than substantially vertical, using various techniques known collectively as "directional drilling." Directional drilling enables having a single wellbore penetrate one or more subsurface reservoirs that are located at substantial geodetic distances from the surface location of the wellbore. Although not limited to such use, a common use for directional drilling is to enable penetrating a number of laterally separated subsurface reservoirs from a single marine platform. Directional drilling is also used in environmentally sensitive areas, such as the Arctic, where it is desirable to minimize the area at the surface affected by drilling operations.

An important aspect of directional drilling is accurate surveying of the wellbore trajectory so that the spatial position of the wellbore in three dimensions is known precisely at every point along the wellbore. Typical techniques for surveying include gyroscopic surveying and combination magnetic/gravitational surveying. See, for example, U.S. Pat. No. 4,920,655 issued to van Steenwyk for an example of gyroscopic survey instrumentation. U.S. Pat. No. 7,405,563 issued to Kruspe et al. describes an example magnetic/gravitational survey instrument. Using the foregoing surveying techniques, however, can result in wellbore position determination that becomes less accurate with increasing lateral distance from the surface position of the wellbore. Less certainty in positioning the wellbore can result, for example, in increased risk of collision of a wellbore with an adjacent wellbore in cases where a plurality of wellbores are drilled from a single surface location or similar cases where wellbores are proximate each other. Loss of positional accuracy may result in one or more target reservoirs not being penetrated by the wellbore, which may require expensive and time consuming replacement of the wellbore to penetrate such targets.

Accordingly, there continues to be a need to wellbore trajectory determination methods that have improved accuracy.

SUMMARY OF THE INVENTION

A method for determining geodetic position of a wellbore in the Earth's subsurface according to one aspect of the invention includes actuating a plurality of seismic energy sources each disposed at a known geodetic position. Seismic energy from the sources is detected at a selected location along the wellbore. The geodetic position at the selected location is determined from the detected seismic energy.

A corresponding method according to another aspect of the invention includes actuating a seismic energy source at a selected position within the wellbore. The seismic energy is detected at a plurality of known geodetic positions. The geodetic position of the source is determined from the detected seismic energy.

A method for drilling a wellbore through subsurface rock formations according to another aspect of the invention includes either (i) actuating a seismic energy source at a selected location along the wellbore and detecting the seismic energy at a plurality of known geodetic positions, or (ii) actuating a seismic energy source at a plurality of known geodetic positions and detecting the seismic energy at a selected location along the wellbore. A geodetic position of the wellbore at the selected location is determined from the detected seismic energy. A trajectory of the wellbore is adjusted based on the determined geodetic position of the wellbore.

Other aspects and advantages of the invention will be apparent from the following description and the appended claims.

DETAILED DESCRIPTION

Figure 1:
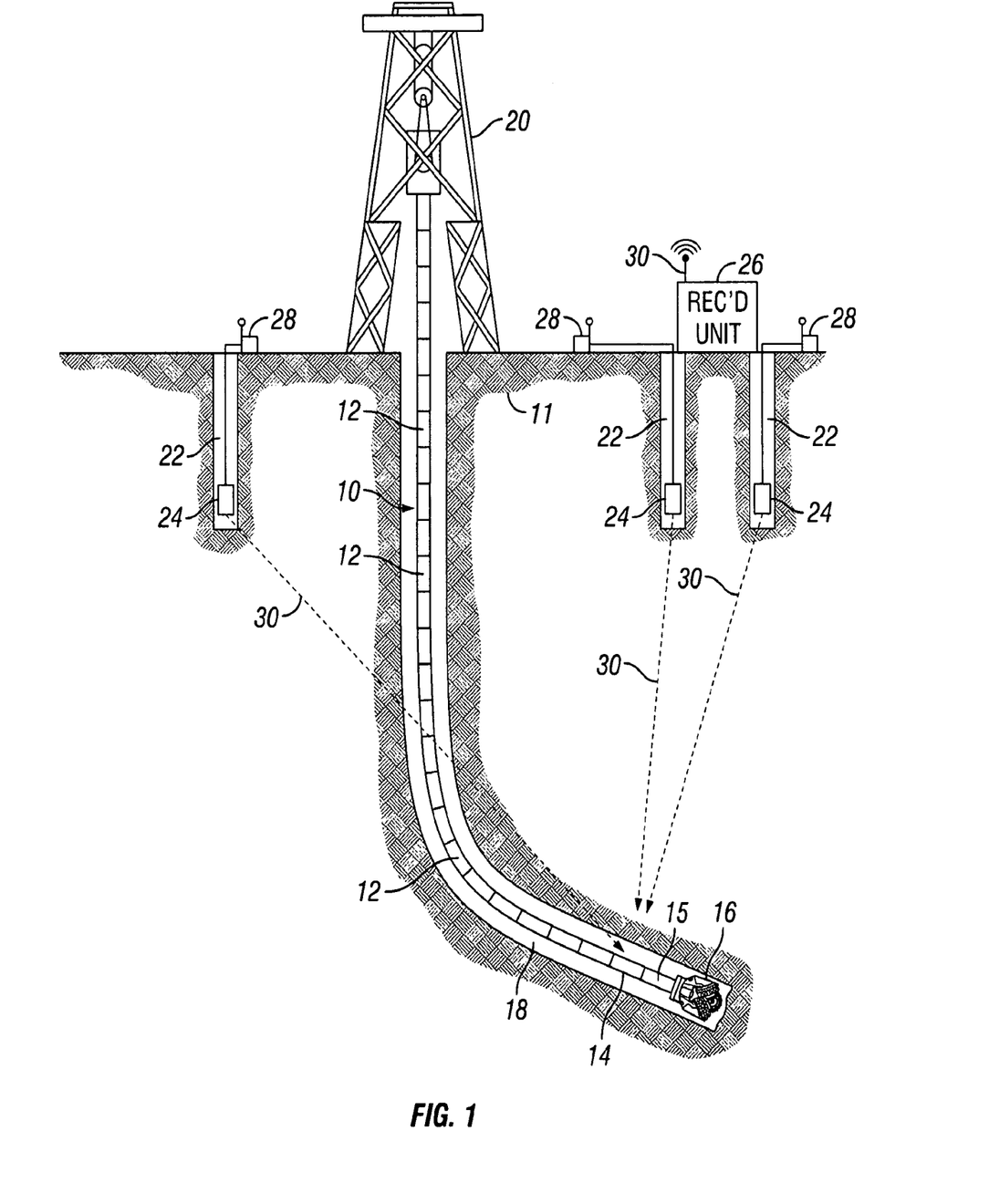
FIG. 1 shows an example of drilling a wellbore using a seismic receiver in the wellbore and seismic sources in shallow wells.

FIG. 1 shows a simplified schematic diagram of a wellbore 18 being drilled through subsurface rock formations 11. Drilling can be performed using a drill string 10 assembled from threadedly coupled sections or "joints" 12 of pipe suspended in the wellbore 18 by a hoisting unit called a drilling rig 20. A drill bit 16 is disposed at the lower end of the drill string 10 to drill through the rock formations 11, thereby extending or deepening the wellbore 18. The drill string 10 may include proximate its lower end a logging while drilling ("LWD") instrumentation package 14 of types well known in the art. Such LWD instrumentation package 14 may include a seismic sensor 15 therein. One example of a seismic sensor included in a LWD instrumentation package is used to provide services under the trademark SEISMIC VISION, which is a trademark of the assignee of the present invention. Alternatively, a seismic sensor (not shown) may be removably inserted into the drill string 10 to about the same longitudinal position therein as shown for the LWD instrument package 14, for example, by including a muleshoe sub (not shown) in the drill string 10 and pumping a self-contained seismic sensor (not shown) through the interior of the drill string 20 until is seats in the muleshoe sub (not shown). One example of the foregoing self-contained seismic sensor is described in U.S. Pat. No. 5,555,220 issued to Minto.

In one example, the joints 12 of the drill string 10 may include an electrical and/or optical signal channel therein (not shown in FIG. 1). Such pipe is known as "wired drill pipe" ("WDP"). An example structure for WDP is described in U.S. Patent Application Publication No. 2006/0225926 filed by Madhavan et al., the underlying patent application for which is assigned to the assignee of the present invention. In drill strings that use WDP, signals detected by the seismic sensor 15 may be communicated over the WDP signal channel essentially instantaneously to a recording unit 26 disposed at the surface for processing as will be further explained. If WDP is not used for the drill string 10, signals may be recorded in the LWD instrumentation package 14 using techniques known in the art. The recorded signals may be recovered by interrogating the recordings in the LWD instrument package 14 when the drill string 10 is withdrawn from the wellbore 18, and/or signal communication may be provided by, for example, modulating flow of drilling fluid through the interior of the drill string 10 using techniques well known in the art. If a self-contained seismic sensor such as shown in the Minto '220 patent is used, signals may be recorded therein and recovered when the self-contained seismic sensor is withdrawn from the interior of the drill string 20.

The source of seismic signals detected by the sensor 15 may be a plurality of wellbore seismic energy sources 24 each disposed in a respective shallow wellbore 22. The shallow wellbores 22 are preferably drilled to a depth below the "weathered layer" (not shown separately) portion of the rock formations 11, such portion being generally disposed at the top of the rock formations. The weathered layer, and its functional equivalent of shallow sediments below the water bottom in marine environments, are susceptible to attenuation of higher frequency seismic energy from the sources 24 and much greater overall attenuation of the seismic energy than rock formations below such weathered layer. The seismic energy sources 24 may be permanently or removably emplaced in the respective shallow wellbores 22. The shallow wellbores 22 may have their surface (uppermost end) geodetic positions accurately surveyed, and may be drilled substantially vertically to have a "bottom hole" (lower end) geodetic position substantially the same as the surface position. Techniques for substantially vertical drilling wellbores may include using "rotary steerable" directional drilling devices specifically configured to maintain the wellbore along a true vertical trajectory. One example of such a device is described in U.S. Pat. No. 4,407,374 issued to Wallusek et al. Other examples of such devices are shown in U.S. Pat. No. 5,803,185 issued to Barr et al. and currently commonly owned with the assignee of the present invention. By disposing the seismic energy sources 24 in respective shallow wellbores 22 drilled as explained above, the precise geodetic position of each seismic energy source 24 can be determined.

A non-limiting example of a seismic energy source that may be used in some examples is described in U.S. Pat. No. 6,193,010 issued to Minto. A possible advantage of using a source such as described in the Minto '010 patent and emplacing the sources 24 in such wellbores 28 is that higher frequency seismic energy (200 to 1000 Hz) may propagate sufficiently so as to be detectable by the seismic sensor 15 in the wellbore 18. By effectively communicating higher frequency seismic energy to the sensor 15, it may be possible to more accurately determine the position of the sensor 15 relative to the sources 24.

The seismic energy sources 24 may be actuated by wireless communication (e.g., using wireless transceivers 28 with a wireless source controlled 30 in the recording unit 26. Such communication with the source controller 30 may provide accurate synchronization of the seismic sources 24. When the sources 24 are actuated, seismic energy 30 travels outwardly therefrom and eventually can be detected by the seismic sensor 15. A relative phase of the detected seismic energy between detected seismic energy from each of the sources 24 may be used to determine the length of the acoustic energy travel path between each source 24 and the sensor 15. Having a plurality of travel path lengths determined along a plurality of different directions enables determining the spatial position of the seismic sensor 15 with respect to each of the sources 24. If the shallow wellbores 22 are suitably spatially distributed and their geodetic positions are accurately determined, then the spatial position of the seismic sensor 15 may be accurately determined at any time. By repeating the foregoing procedure at selected times as the wellbore 18 is drilled, the trajectory (path in three spatial dimensions) of the wellbore 18 may be determined.

While it is contemplated that a large number of individual seismic sensor positions may be determined during drilling of the wellbore 18 for accurate trajectory determination, it is within the scope of the present invention to provide relatively limited numbers of sensor positions (e.g., every 30 to 100 feet [10 to 30 meters]) and interpolate the trajectory using techniques such as tangential interpolation, radius of curvature interpolation and minimum curvature interpolation. The foregoing interpolation techniques are known in the art for wellbore trajectory surveying using magnetic/gravity and gyroscopic surveying.

It will be appreciated by those skilled in the art that the velocity and phase of the seismic energy emanating from each source 24 may be substantially modified by the acoustic properties of the rock formations 11 disposed between each source 24 and the seismic sensor 15. In some examples, the relative phase, spectral content and timing of seismic signals arriving from each source 24 may be modified to account for the acoustic properties of the formations estimated to be on each seismic energy travel path from the source 24 to the sensor 15. In some examples, a seismic energy travel path may be estimated by using conventional wellbore surveying techniques (e.g., gyroscopic and/or geomagnetic-gravitational) to make an initial estimate of the position of the seismic sensor. A conventional survey device (not shown separately) may be included in the LWD instrumentation package 14, and signals therefrom may be communicated to the recording unit 38 using the WDP communication channel and/or mud flow modulation telemetry. The estimated position may be used in connection with surface reflection seismic data and any other acoustic data, such as acoustic well log data from nearby wellbores to estimate acoustic properties of the formations 11 along each respective seismic energy travel path. Such acoustic properties may be used to estimate a phase shift and frequency dependent attenuation (dispersion) of the seismic energy from each source 24 at it arrives at the sensor 15. By estimating phase shift and dispersion, sensor position calculations based on acoustic phase shift and/or travel time from each source 24 to the sensor 15 will be more precise.

In a particular example, the LWD instrument package 14 may include a directional sensor (not shown separately). As is known in the art, the directional sensor generates signals related to the inclination of the wellbore from vertical (along the direction of the Earth's gravitational field) and the geodetic direction (azimuth) of the wellbore along its trajectory. Using techniques known in the art, it is possible to convert measurements of wellbore inclination, azimuth and the axial length ("measured depth") of the wellbore into a value of true vertical depth ("TVD") of the wellbore. TVD is the distance from any point in the wellbore to the Earth's surface (or any other surface reference such as on the drilling unit, water bottom, water surface, etc.) along a vertical line intersecting the point and the surface. Other techniques for determining TVD may include measurement of fluid pressure in the wellbore and measurement of density of the fluid in the wellbore. The TVD may be used in the present example to avoid the need to determine the acoustic properties of the formations through which the wellbore is drilled.

The position of the seismic sensor on the drill string may be considered to be at one end of a vertical line represented by TVD. The positions of, for example, two of the seismic energy sources may be represented as disposed at lateral distances $X_1$ and $X_2$ from the intersection of the vertical line TVD in the plane parallel to the Earth's surface. The distance between the sources may be represented by X. The distance through the subsurface between each source, Di, and the seismic sensor will be related to the respective lateral distance $X_i$ and the TVD as follows:

$$D_i^2 = TVD^2 + X_i^2 \qquad (1)$$

Because the TVD is determined, it is possible to use the ratio of seismic energy travel times and assume that the subsurface formations are effectively acoustically homogeneous.

$$\frac{TVD^2 + X_1^2}{TVD^2 + X_2^2} = K^2 \qquad (2)$$

$$X_2 = X - X_1 \qquad (3)$$

$$X_1 = \frac{X^2 - TVD^2 * (1 - K^2)}{2X} \qquad (4)$$

Equation (4) can be used to determine the distance between one of the sources and the seismic sensor. The distance between the seismic sensor and the other source can be obtained using Equation (3). The distances may be used to determine the geodetic position of the sensor, e.g., by triangulation. The foregoing distances may be used, in some examples, with a statistical algorithm to determine the mean sensor position and a positional uncertainty radius. The foregoing example equations can be used with more than two sources.

It will be appreciated by those skilled in the art that TVD can be determined quite accurately using sensors known in the art such as triaxial accelerometers and inclinometers. Typical accuracy of such sensors is on the order of 0.1 degree inclination, and error in measurement is not cumulative along the length of the wellbore or related to distance between the surface location and bottom hole location of the wellbore.

Figure 2:
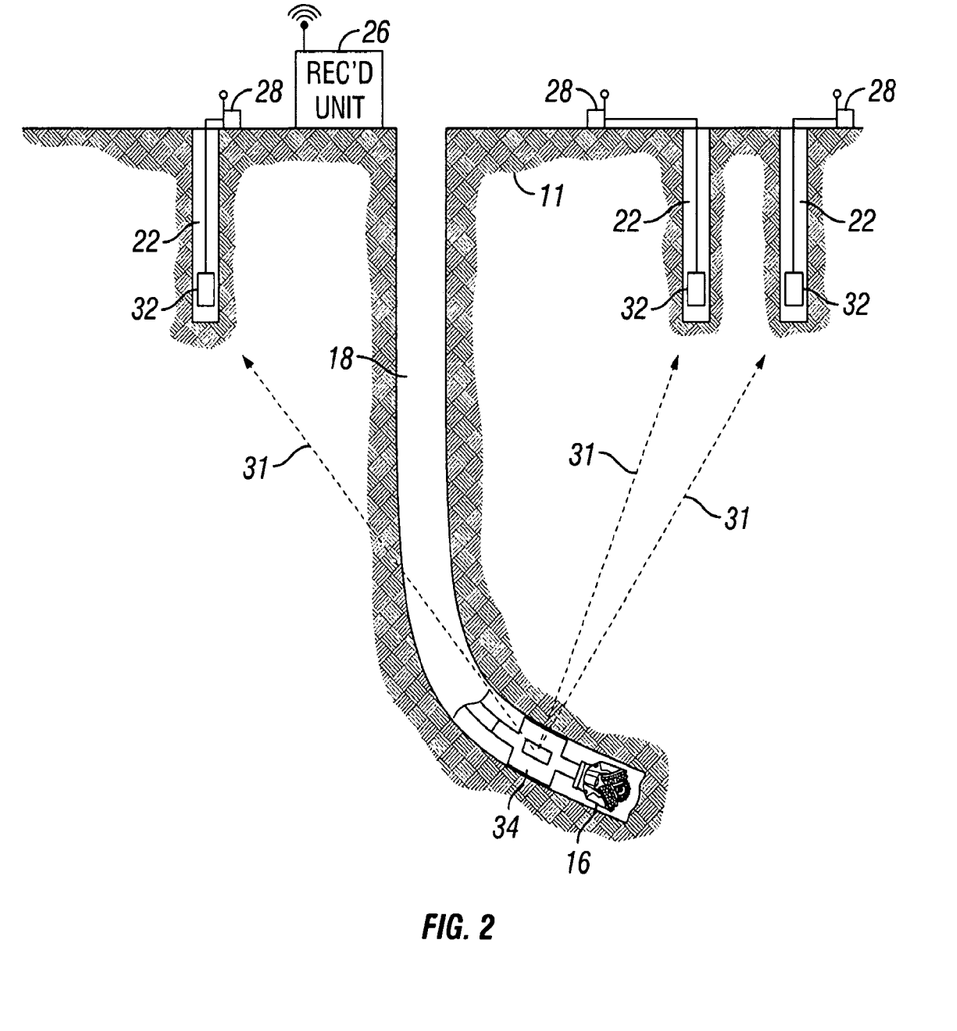
FIG. 2 shows an example of drilling a wellbore using a seismic source in the wellbore and seismic receivers in shallow wells.

A corresponding, but inverse configuration to the one shown in FIG. 1 is shown in FIG. 2. In FIG. 2, the drill string (10 in FIG. 1) includes a seismic energy source 34 proximate the lower end thereof, for example, near the drill bit 16. One non-limiting example of a seismic energy source conveyable on a drill string is shown in U.S. Patent Application Publication No. 2004/0240320 filed by McDonald et al. Another example seismic energy source for use during drilling is described in U.S. Pat. No. 5,382,760 issued to Staron. The source 34 may be actuated at selected times, for example in a preprogrammed sequence available in the recording unit 26. At the selected times, seismic receivers 32 each disposed in one of the shallow wellbores 22 may detect seismic energy 31 emanating from the source 34. The signals so detected may be communicated to the recording unit 26 for processing. Position of the source 34 may be determined by phase and/or travel time of the seismic energy 31, just as explained with reference to the example shown in FIG. 1. A non-limiting example of a wellbore seismic receiver that may be used in some examples is shown in U.S. Pat. No. 4,715,469 issued to Yasuda et al.

Another example of a seismic energy source that may be used in a wellbore is described at the Uniform Resource Locator (URL) http://adsabs.harvard.edu/abs/2005AGUSMNS51A..05R. Another seismic energy source that may be used in a wellbore is described in U.S. Pat. No. 4,874,061 issued to Cole. Another seismic energy source that may be used in some examples is described in U.S. Patent Application Publication No. 2008/0110691 filed by Chang et al., the underlying patent application for which is assigned to the assignee of the present invention. Another seismic energy source that may be used in some examples is described in U.S. Patent Application Publication No. 2007/0039776 filed by Clark, the underlying patent application for which is assigned to the assignee of the present invention.

Figure 3:
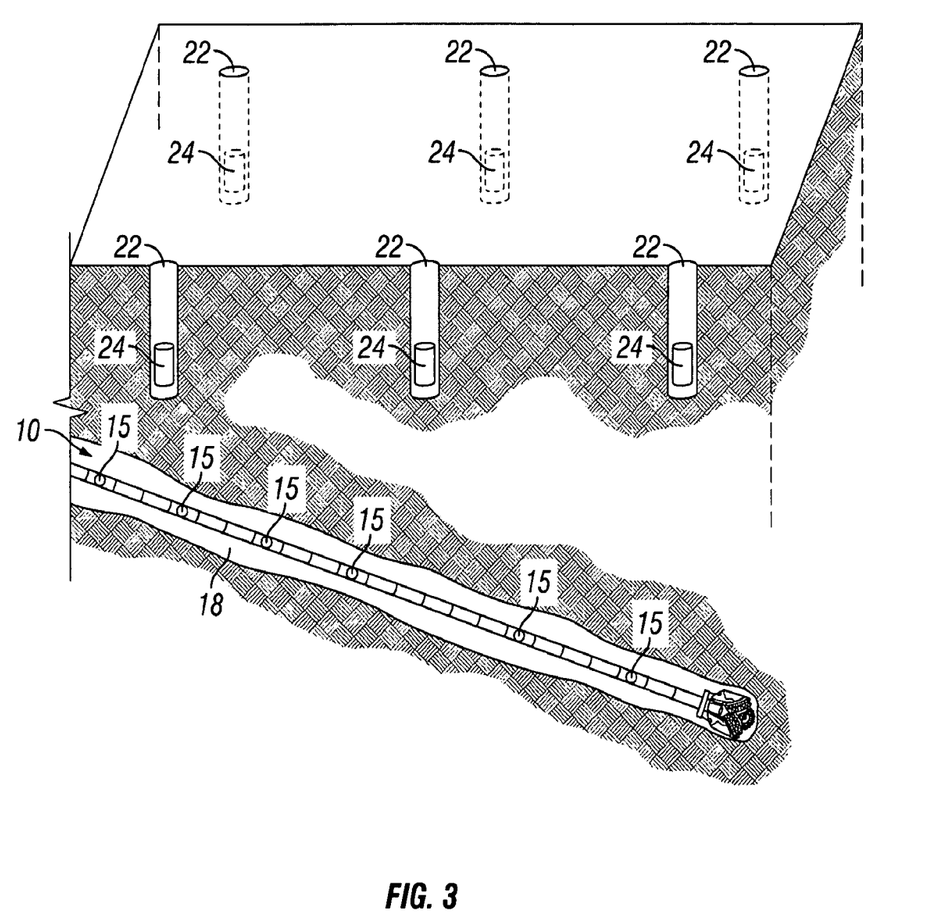
FIG. 3 shows another example well drilling system including a plurality of seismic sensors disposed at spaced apart positions along the drill string.

Another example drilling system is shown in a partial schematic diagram in FIG. 3. The system includes a plurality of seismic sensors 15 disposed at spaced apart locations along the drill string 10. The seismic sensors 15 may be configured substantially as described above with reference to FIG. 1, for example. A plurality of seismic energy sources 24, which may be substantially as explained above, may be disposed in corresponding shallow wellbores 22, or may be disposed along the land surface or in the water in marine environments. The sources 24 may be operated substantially as explained with reference to FIG. 1. The locations of the sources 24 may be selected such that they are disposed generally along and generally transversely to the trajectory of the wellbore 18 during drilling. By such arrangement of sources 24 and sensors 15, the trajectory of the wellbore 18 may be accurately determined during drilling. As explained with reference to FIG. 1, the sources 24 can be actuated at selected times, the seismic energy is detected at the sensors 15, and distances between the sources and sensors are determined from the detected seismic energy. The determined distances can be used to determine spatial position of the seismic sensors 15.

Figure 4:
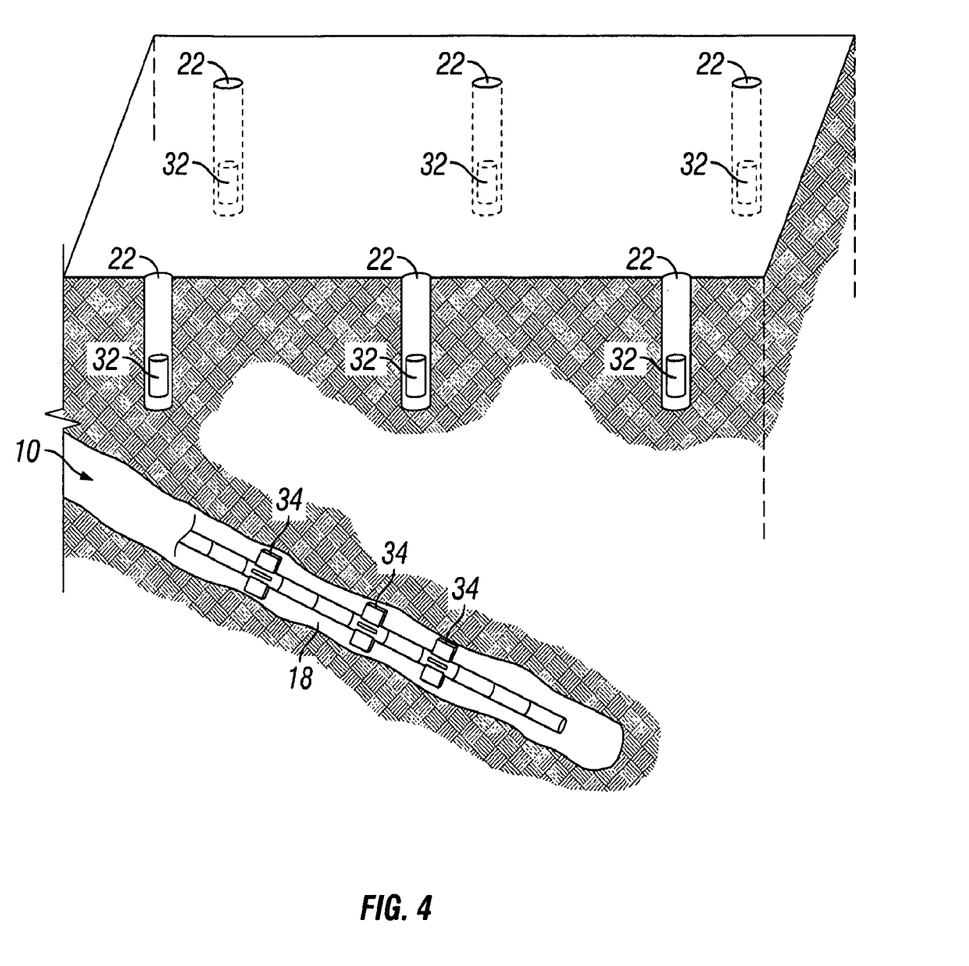
FIG. 4 shows another example well drilling system including a plurality of seismic sources disposed at spaced apart positions along the drill string.

A corresponding and inverted arrangement to that shown in FIG. 3 is shown in FIG. 4. The arrangement shown in FIG. 4 includes a plurality of seismic energy sources 34 disposed at spaced apart locations within and along the drill string 10. The sources 34 may be as explained with reference to FIG. 2. A plurality of seismic sensors 32 may be disposed in respective shallow wellbores, also as explained with reference to FIG. 2. The sensors 32 may also be disposed on the land surface or in the water in marine surveying. The shallow wellbores and/or the seismic sensors 32 may be disposed generally along and transversely to the intended trajectory of the wellbore 18. The trajectory of the wellbore 18 may be determined by travel time and/or phase of the seismic energy, as explained with reference to FIG. 1.

Figure 5:
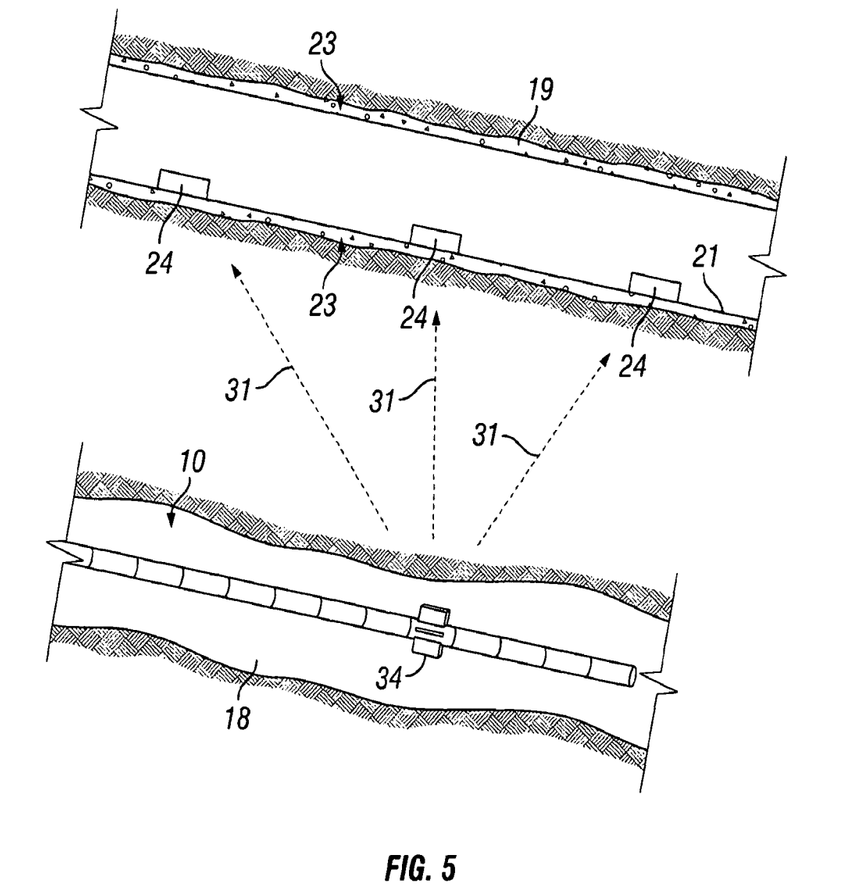
FIG. 5 shows an example of using a seismic source in a wellbore being drilled and seismic sensors in an adjacent wellbore.

Another example is shown in FIG. 5, in which a drill string 10 including a seismic energy source 34, such as explained above with reference to FIG. 2 is used to drill a wellbore 18. An adjacent wellbore 19 may follow a trajectory that causes the adjacent wellbore to be located at small enough distances from the drilling wellbore 18 to require enhanced drilling safety measures in the drilling wellbore 18. In the disclosed example, the adjacent wellbore 19 may include a pipe or casing 21 disposed therein and sealed to the wellbore 19 with cement 23 of compositions known in the art. Such a wellbore may provide suitable places to permanently or removably affix seismic sensors 24 at spaced apart locations along the interior of the casing 21, or the wellbore 19 itself if no casing is used. The seismic sensors 24 may be similar to those explained with reference to FIG. 1, for example. During drilling operations, the source 34 is actuated at selected times and the seismic energy therefrom is detected by the seismic sensors 24. By having the sensors 24 at spaced apart locations, it is possible to determine the lateral distance between the drilling wellbore 18 and the adjacent wellbore 19. If the distance between the wellbores 18, 19 falls below a predetermined safety limit, adjustment to the trajectory of the drilling wellbore 18 may be made to reduce possibility of wellbore collision.

It will be appreciated by those skilled in the art that the arrangement shown in FIG. 5 may be substituted by a corresponding, inverse arrangement such as using the multiple source drill string shown in FIG. 4 in the wellbore 18, while using a plurality of spaced apart seismic sensors in the adjacent wellbore, such as the drill string arrangement shown in FIG. 3, or the single sensor drill string arrangement shown in FIG. 1. By the principle of reciprocity, any arrangement of seismic energy sources and seismic sensors shown herein has a corresponding, inverse arrangement of seismic energy sources and seismic sensors that can be used equally to determine geodetic position at selected positions along a wellbore using a plurality of known geodetic positions in an adjacent wellbore and/or near the Earth's surface.

In a method for directional drilling a wellbore according to another aspect of the invention, a geodetic position of the wellbore may be determined as explained above with reference to any of FIGS. 1 through 5. When the geodetic position of the wellbore is determined, any changes required in the trajectory of the wellbore may be made by operating the drill string to effect trajectory change using any technique known in the art, including without limitation, using a steerable hydraulic motor, whipstock, rotary steerable directional drilling system. See, for example, U.S. Pat. No. 6,089,332 issued to Barr et al. and commonly owned with the assignee of the present invention for an example of a rotary steerable directional drilling system. The system disclosed in the Barr et al. '332 patent is known by the trademark POWERDRIVE, which is a trademark of the assignee of the present invention. Adjustment to the wellbore trajectory may be made on the basis of differences between the determined geodetic position of the wellbore and a planned geodetic position of the wellbore at a same measured depth thereof.

Wellbore surveying and directional drilling using the foregoing techniques may overcome a limitation of wellbore surveying using gyroscopic and magnetic/gravity surveying techniques known in the art, namely, that accuracy of determining position decreases as lateral distance from the wellbore surface location increases. Methods according to the various aspects of the invention may be used in conjunction with gyroscopic and/or magnetic/gravity surveying techniques known in the art to better determine geodetic trajectory of a wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a geodetic position of a location of a first at least partially horizontal wellbore in the Earth's subsurface, comprising:
   actuating a plurality of seismic energy sources, the plurality of seismic energy sources comprising a first seismic source disposed at a first geodetic position and a second seismic source disposed at a second geodetic position different from the first geodetic position, wherein the first and second seismic sources are disposed beneath the surface of the Earth;
   using a sensor located on a downhole apparatus disposed in the first at least partially horizontal wellbore to ascertain data indicative of a true vertical depth at a location along the wellbore;
   using a sensor located on the downhole apparatus disposed in the first at least partially horizontal wellbore to detect seismic energy from the sources at the selected location along the wellbore; and
   determining the geodetic position of the selected location of the first at least partially horizontal wellbore from the detected seismic energy and the true vertical depth by treating the geological formation as having acoustically homogeneous properties, wherein the geological formation actually has acoustically heterogeneous properties;
   wherein the first seismic source is disposed in a second wellbore drilled substantially vertically through a weathered layer of rock formations and the second seismic source is disposed in a third wellbore drilled substantially vertically through the weathered layer of rock formations, and wherein the second and third wellbores each have a lower end that is shallower with respect to the first at least partially horizontal wellbore in which the downhole apparatus is disposed, and wherein the first and second geodetic positions are disposed substantially along an expected horizontal trajectory of the first at least partially horizontal wellbore in which the downhole apparatus is disposed and substantially transversely to the expected trajectory.

2. The method of claim 1, wherein the selected location in the first at least partially horizontal wellbore is along a drill string used to drill the wellbore.

3. The method of claim 1, comprising repeating actuating the sources, detecting seismic energy and determining geodetic position at a plurality of selected locations along the first at least partially horizontal wellbore, and determining a geodetic trajectory of the first at least partially horizontal wellbore from the determined geodetic locations.

4. The method of claim 3, wherein determining the geodetic trajectory comprises interpolation between the determined geodetic locations.

5. The method of claim 1, wherein determining the geodetic position comprises determining the true vertical depth of the selected position wherein the detecting is performed, and using the true vertical depth to determine distances between the selected position and the first and second geodetic positions without considering acoustical inhomogeneities of the geological formation.

6. The method of claim 5, wherein determining the geodetic position of the first at least partially horizontal wellbore comprises determining in a plane substantially parallel to the surface of the Earth a lateral distance between the first seismic source and the second seismic source and a substantially vertical line representing the true vertical depth of the selected location using at least a ratio of seismic energy travel time from the first seismic source to the sensor and seismic energy travel time from a second seismic source to the sensor as if the geological formation were acoustically homogeneous despite actually being acoustically heterogeneous.

7. The method of claim 1, wherein the second and third substantially vertical wellbores have substantially the same depth.

8. The method of claim 1, wherein the geodetic position of the selected location of the first at least partially horizontal wellbore is determined according to the relationship:

$$\frac{TVD^2 + X_1^2}{TVD^2 + X_2^2} = K^2$$

$$X_2 = X - X_1$$

$$X_1 \frac{X^2 - TVD^2 = (1 - K^2)}{2X}$$

where TVD corresponds to the true vertical depth of the selected location, $X_1$ corresponds to a first lateral distance of the first seismic source from an intersection of a vertical line of the true vertical depth in a plane parallel to the Earth's surface, $X_2$ corresponds to a second lateral distance of the second seismic source from the intersection of the vertical line of the true vertical depth in the plane parallel to the Earth's surface, and X corresponds to a distance between the first seismic source and the second seismic source.

9. The method of claim 1, comprising precisely determining the first geodetic position by geodetically surveying an uppermost end of the second wellbore before drilling the second wellbore substantially vertically such that a lower end of the second wellbore has substantially the same geodetic position.

10. A method for determining a geodetic position of a location of a first at least partially horizontal wellbore in the Earth's subsurface, comprising:
  using a sensor located on a downhole apparatus disposed in the first at least partially horizontal wellbore to ascertain data indicative of a true vertical depth at a location along the wellbore;
  actuating a seismic energy source located on the downhole apparatus disposed in the first at least partially horizontal wellbore to emit seismic energy from the source at the selected location along the wellbore;
  detecting the seismic energy from the seismic energy source using a plurality of seismic energy sensors, the plurality of seismic energy sensors comprising a first seismic sensor disposed at a first geodetic position and a second seismic sensor disposed at a second geodetic position different from the first geodetic position, wherein the first and second seismic sensors are disposed beneath the surface of the Earth; and
  determining the geodetic position of the selected location of the first at least partially horizontal wellbore from the detected seismic energy and the true vertical depth by treating the geological formation as having acoustically homogeneous properties, wherein the geological formation actually has acoustically heterogeneous properties;
  wherein the first seismic sensor is disposed in a second wellbore drilled substantially vertically through a weathered layer of rock formations and the second seismic sensor is disposed in a third wellbore drilled substantially vertically through the weathered layer of rock formations, and wherein the second and third wellbores each have a lower end that is shallower with respect to the first at least partially horizontal wellbore in which the downhole apparatus is disposed, and wherein the first and second geodetic positions are disposed substantially along an expected horizontal trajectory of the first at least partially horizontal wellbore in which the downhole apparatus is disposed and substantially transversely to the expected trajectory.

11. The method of claim 10, wherein the selected location in the first at least partially horizontal wellbore is along a drill string used to drill the wellbore.

12. The method of claim 10, comprising repeating actuating the source, detecting the seismic energy and determining the geodetic position at a plurality of selected locations along the first at least partially horizontal wellbore, and determining a historical geodetic trajectory of the first at least partially horizontal wellbore from the determined geodetic locations.

13. The method of claim 12, wherein determining the geodetic trajectory comprises interpolation between the determined geodetic locations.

14. The method of claim 10, wherein determining the geodetic position comprises determining the true vertical depth of the selected position wherein the actuating is performed, and using the true vertical depth to determine distances between the selected position and the first and second geodetic positions without considering acoustical inhomogeneities of the geological formation.

15. The method of claim 10, wherein determining the geodetic position of the first at least partially horizontal wellbore comprises determining in a plane substantially parallel to the surface of the Earth a lateral distance between the first seismic sensor and the second seismic sensor and a substantially vertical line representing the true vertical depth of the selected location using at least a ratio of seismic energy travel time to the first seismic sensor from the seismic source and seismic energy travel time to the second seismic sensor from the seismic source as if the geological formation were acoustically homogeneous despite actually being acoustically heterogeneous.

16. The method of claim 10, wherein the geodetic position of the selected location of the first at least partially horizontal wellbore is determined according to the relationship:

$$\frac{TVD^2 + X_1^2}{TVD^2 + X_2^2} = K^2$$

$$X_2 = X - X_1$$

$$X_1 \frac{X^2 - TVD^2 = (1 - K^2)}{2X}$$

where TVD corresponds to the true vertical depth of the selected location, $X_1$ corresponds to a first lateral distance of the first seismic sensor from an intersection of a vertical line of the true vertical depth in a plane parallel to the Earth's surface, $X_2$ corresponds to a second lateral distance of the second seismic sensor from the intersection of the vertical line of the true vertical depth in the plane parallel to the Earth's surface, and X corresponds to a distance between the first seismic sensor and the second seismic sensor.

17. The method of claim 10, comprising precisely determining the first geodetic position by geodetically surveying an uppermost end of the second wellbore before drilling the second wellbore substantially vertically such that a lower end of the second wellbore has substantially the same geodetic position.

18. A method comprising:
identifying a first geodetic location at a first surface location;
drilling a first wellbore substantially vertically into a geological formation from the first surface location and placing a first seismic source at a lowermost end of the first wellbore;
identifying a second geodetic location at a second surface location;
drilling a second wellbore substantially vertically into a geological formation from the second surface location and placing a second seismic source at a lowermost end of the second wellbore;
drilling a third, at least partially horizontal, wellbore having an expected horizontal trajectory substantially aligned along the first and second geodetic locations; and
using seismic energy emitted from the first and second seismic sources to determine a third geodetic location within the third, at least partially horizontal, wellbore where a seismic sensor is located, by determining in a plane substantially parallel to the surface of the Earth a lateral distance between the first seismic source and the second seismic source and a substantially vertical line representing a true vertical depth of the third geodetic location using a ratio of seismic energy travel time from the first seismic source to the seismic sensor and seismic energy travel time from the second seismic source to the seismic source as if the geological formation were acoustically homogeneous despite actually being acoustically heterogeneous.

19. The method of claim 18, wherein the geodetic position of the selected location of the third, at least partially horizontal, wellbore is determined according to the relationship:

$$\frac{TVD^2 + X_1^2}{TVD^2 + X_2^2} = K^2$$

$$X_2 = X - X_1$$

$$X_1 \frac{X^2 - TVD^2 = (1 - K^2)}{2X}$$

where TVD corresponds to the true vertical depth of the third geodetic location, $X_1$ corresponds to a first lateral distance of the first seismic source from an intersection of a vertical line of the true vertical depth in a plane parallel to the Earth's surface, $X_2$ corresponds to a second lateral distance of the second seismic source from the intersection of the vertical line of the true vertical depth in the plane parallel to the Earth's surface, and X corresponds to a distance between the first seismic source and the second seismic source.

20. The method of claim 19, wherein the first and second wellbores are shallower than the third, at least partially horizontal, wellbore but deeper than a weathered layer of the geological formation to avoid attenuation of seismic energy that would otherwise occur through the weathered layer.

\* \* \* \* \*